United States Patent [19]
Nigawara et al.

[11] Patent Number: 5,410,883
[45] Date of Patent: May 2, 1995

[54] CONTROL SYSTEM FOR PLANT

[75] Inventors: Seiitsu Nigawara; Shigeaki Namba; Hiroshi Kohmoto, all of Hitachi, Japan

[73] Assignee: Hitachi, Ltd., Tokyo, Japan

[21] Appl. No.: 941,897

[22] Filed: Sep. 8, 1992

[30] Foreign Application Priority Data

Sep. 5, 1991 [JP] Japan ............... 3-225614

[51] Int. Cl.⁶ .................................... F01K 13/00
[52] U.S. Cl. .................................... 60/646; 60/667; 60/665; 60/660
[58] Field of Search .............. 60/646, 660, 661, 662, 60/663, 664, 665, 666, 667

[56] References Cited

U.S. PATENT DOCUMENTS

| | | | |
|---|---|---|---|
| 4,226,086 | 10/1980 | Binstock et al. | 60/664 |
| 4,651,553 | 3/1987 | Ura et al. | 60/646 |
| 4,792,912 | 12/1988 | Kuramoto et al. | 60/646 |
| 4,888,953 | 12/1989 | Fukayama et al. | 60/646 |

FOREIGN PATENT DOCUMENTS

16719  1/1982 Japan.
207200 9/1987 Japan.

*Primary Examiner*—Edward K. Look
*Assistant Examiner*—James A. Larson
*Attorney, Agent, or Firm*—Antonelli, Terry, Stout & Kraus

[57] ABSTRACT

In a plant for which process control is made, a margin of an operation allowable limit for a process variable is variably established according to situations for each apparatus constituting the plant. In addition, allowable upper limits of operation considering a life consumption state and an operation schedule of each apparatus are established for respective apparatus on the basis of a life of the whole plant. The life of each apparatus and the life of the whole plant are controlled with a goal to expire all equipment substantially at the same time by reflecting the allowable operating conditions of the apparatus constituting the plant on the plant control. Therefore, it is possible to realize rational and useful plant operation.

8 Claims, 11 Drawing Sheets

CONTROL SYSTEM FOR PLANT

BACKGROUND OF THE INVENTION

This invention relates to control for various plants such as thermal power plants, which employ a control system having an adjust control loop or on-off control loop or both control loops, and particularly to a control system for a plant considering the margin of the operation control value of individual apparatus constituting the plant.

The control system employed in, for example, a thermal power plant, makes use of a current control theory or the like as disclosed in JP-A-57-16719 (laid-open on Jan. 28, 1982), in addition to the PID control for the normal process control. In this control theory, the dynamic characteristics of the plant are converted into a model, thereby predicting variations or a value to arrive at from an amount of an input. In other words, feedforward control is employed for improving the precision of control. Feedforward control, as concretely described in the aforementioned publicly known example, employs a dynamic characteristic model of a superheater of a heat exchanger at each part of a boiler so as to predict a temperature of the vapor and to determine the amount of fuel which should be fed into the boiler.

In another system employed in a thermal power plant, as described in JP-A-62-207200 (laid-open on Sep. 11, 1987), a rate of a load change of a plant and a width of an allowable load change are limited by a magnitude of a rate of load change as expressed in a number of times of load change per unit time with respect to the turbine and generator as individual parts. This system considers conditions of the turbine and generator of individual parts as limits to the loads on the plant.

SUMMARY OF THE INVENTION

Although various different techniques based on the latest control theory have been proposed and practically used for an increase of control precision, such publicly known examples must identify the process dynamics when a model of the plant is developed in the design of a control system. This method can be realized only by use of theoretically high-grade knowledge, and thus, such method cannot satisfy an easy-to-use requirement necessary for wide spread application to the field utilizing the general process control.

The process control utilizing the PID control which has been used so far usually must fix a gain of the control system and so on, and even in a particular case, it only takes a measure of gain switching for optimum control. Therefore, since the control for individual parts decides the particular high-speed response and the degree of importance, the margin for the process control for the periphery apparatus is not considered. Thus, it is difficult to build up a harmonic, or cooperative control for the plant or whole system.

Moreover, in the prior art approach of JP-A-62-207200 given above, the control mechanism considers only the span of life of the turbine and generator, or the so called plant's main apparatus as the individual parts. Therefore, for example, after the end of the plant's life, the main apparatus have substantially worn out as predicted, but the peripheral apparatus of the plant often have not been exhausted in terms of useful life. Since the peripheral apparatus are scrapped although they are useful, the plant is not able to make a cooperative or harmonic operation for simultaneously exhausting useful lives of the main apparatus and peripheral apparatus, or all the apparatus of the plant cannot reach an end of useful life substantially at the same time. In other words, the apparatus having a much longer life than the other should have been used more fully during the operation of the plant. That is, the prior art has the drawback that a control system for making full use of the useful life of all of the respective apparatus cannot be built up in the plant.

Accordingly, in the prior art, when the control system is designed to make the process variable coincident with the target value, it does not consider the life performance of hardware dependent on the specifications of the respective apparatus which constitute the plant, the degree of loss of apparatus life due to operation, an operation margin of various apparatus involved in plant operation (i.e., the actual and maximum operational capacities of the respective apparatus with which the apparatus are under operation when the plant is operated), and an allowable operating limit of the apparatus, and thus the harmonic, or cooperative control with respect to simultaneously exhausting all useful lives of all the equipment within the plant is not satisfactory. This problem must be solved.

According to one aspect of the invention the margin of the operation control value for the process variable is considered with respect to an actual operating point within a range within which the process variable as the element constituting the individual process control can take place. The strength of the control is dynamically changed in accordance with the value of the margin, and the control operations are made in a preferential order. Accordingly, a control amount is immediately made coincident with the target value and a coordination control system is realized which never deviates from the limit for the individual process variable.

A specific example of the control system will be described in which, due to limitations on an apparatus, an operation allowable upper limit is set for a fluid temperature as a process variable according to the operating state. In the normal operation range, the apparatus are assumed to be operated at a temperature $\Delta T_1$ lower than the allowable upper limit. In addition, the valve for adjusting the fluid temperature is assumed to be under proportional integration (PI) control. If now an external disturbance is applied to a control system, thus increasing the fluid temperature by $\Delta T_2$ ($\Delta T_1 \geq \Delta T_2$), the control system itself makes an integration operation for reducing the temperature difference $\Delta T_2$ to 0, by changing the opening of a valve. Moreover, at this time, the means of the invention effectively acts on the control system operation. For example, a control parameter K which is proportional to the reciprocal of the difference of $\Delta T_1 - \Delta T_2$ is established and the PI control gain is multiplied by the parameter K so that the valve is more strongly controlled according to the operation state.

The process variable of the plant or system is actually measured or observed and compared with the target value within the control system. If a difference is present therebetween, an operation amount for operating the auxiliary is produced within the control system in order to make the difference 0. In the course of producing this operation amount, a control function according to the margin up to the operation allowable limit is added, reinforcing the control system operation for reducing the difference to 0. In this case, the process variable is decreased away from the target value. When the margin to the limit peculiar to the process itself is decreased, a parameter size is determined in order for the reduced margin to be restored to the original value. The operation amount is superposed and multiplied. Upon application to the control system, the more the original operation amount of the control system is affected by strong control, the more the margin is reduced.

DESCRIPTION OF PREFERRED EMBODIMENTS

Figure 1:
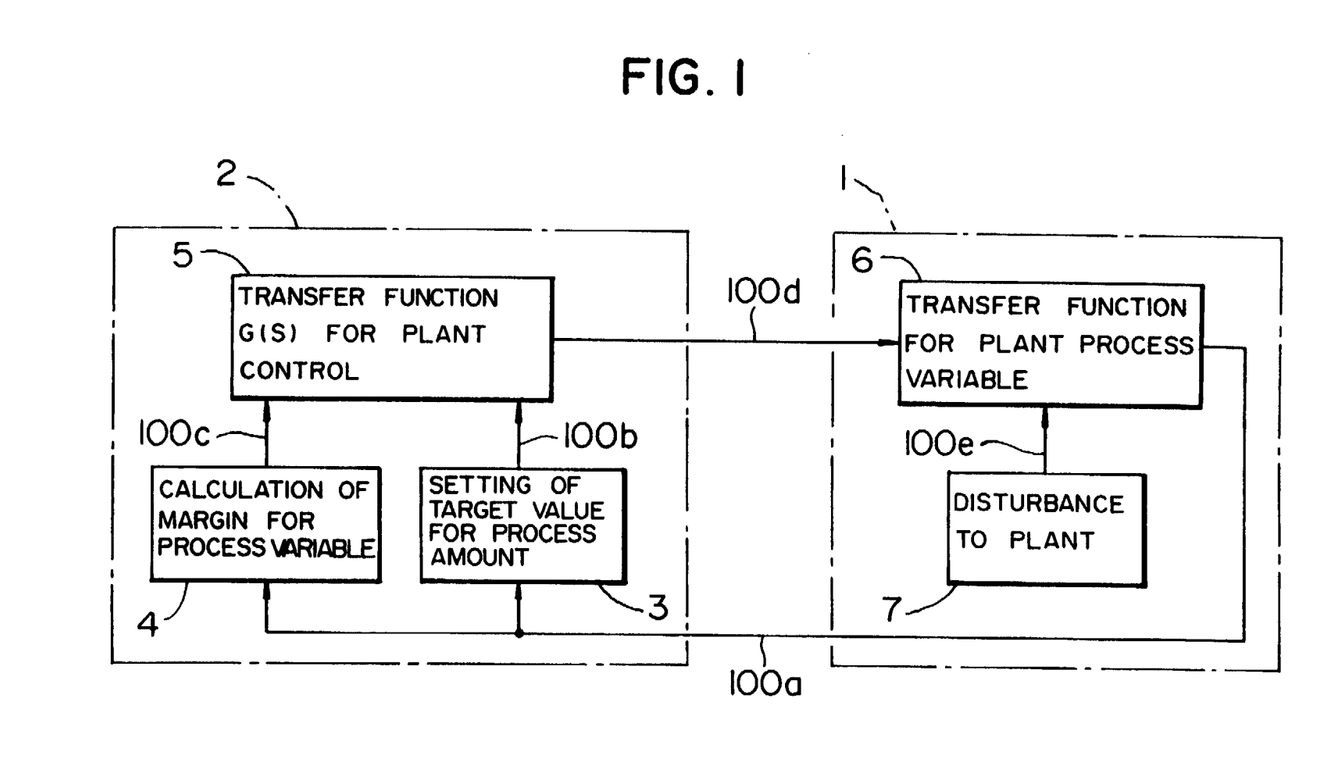
FIG. 1 is a conceptual diagram of margin control.

FIG. 1 is a conceptual diagram of the invention. The transfer function characteristic of a process portion 1 of a plant is expressed by a plant process variable transfer function 6 (H(S)) and a disturbance 7 to the plant. A control portion 2 of the plant includes a setting portion 3 for setting a target process variable, a calculating portion 4 for calculating a process variable operation allowable limit margin and a plant control transfer function 5 (G(S)).

In the prior art, a measured plant process variable 100a is, if necessary, used as the base for setting a target process variable. The target process variable or the difference 100b between the target process variable and the measured value is transmitted as an operation signal 100d from the control transfer function (G(S)) 5 of plant to the process portion 1 of the plant. The process variable transfer function (H(S)) 6 of the plant is supplied with the operation signal 100d and the plant disturbance 100e, and produces the measured process variable 100a. Usually, the process variable of the plant is limited by the limiting condition of the apparatus. In the prior art, the process variable is controlled by various different skillful control logic in the plant control transfer function (G(S)).

In an embodiment of the invention, a margin value 100c for the limited process variable is calculated by the calculation portion 4 for a process variable operation allowable margin. This margin is used to change the strength of the control. The plant control transfer function G(S) 5 is supplied with the margin for the limiting condition to the measured process variable, thereby achieving a more firm and economical control system. This embodiment considers an object to be controlled by a minor loop of the plant process variable. The characteristic and the advantage of such embodiment will be given below.

Figure 2:
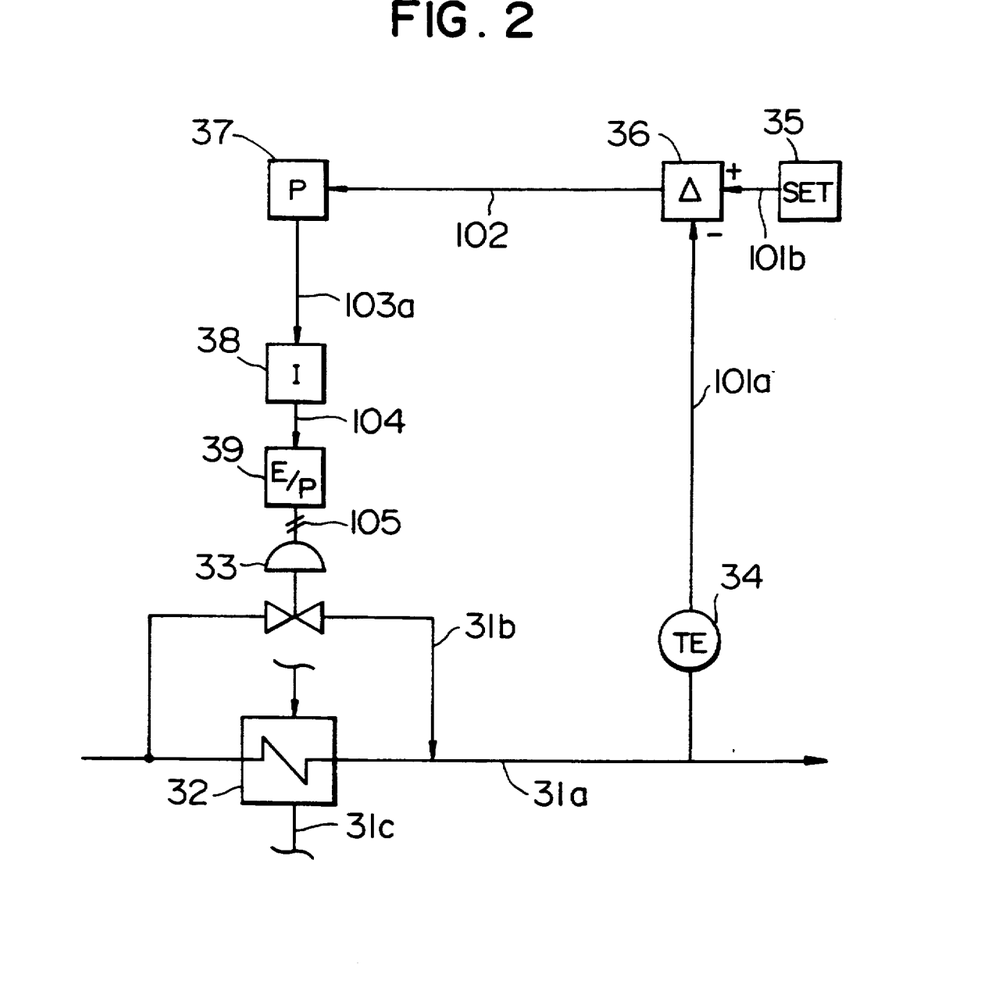
FIG. 2 is a logic diagram for gas/gas heat exchanger outlet gas temperature control.

FIG. 2 shows the prior art for a gas/gas heat exchanger outlet temperature control. In FIG. 2, 31a indicates a heated gas (high temperature gas) pipe, 31b is a heated gas bypass pipe, and 31c is a heating gas (high-temperature gas) pipe. The heated gas of the pipe 31a is passed through a gas/gas heat exchanger 32 and heated by the heating gas pipe 31c. The heated gas temperature is often limited to an upper value for gas heat decomposition prevention or gas backfire prevention. Therefore, the gas flow is divided by the heated gas bypass pipe, and the outlet gas temperature is controlled to be constant by an outlet gas temperature adjust valve 33.

A temperature measuring end 34 produces a difference 36 between the heated temperature signal 101a and the set value signal 101b from a temperature setting device 35. The difference signal 102 undergoes PI control in the minor loop at the normal time. In other words, the difference signal is multiplied at 37 by a control proportional gain Kc so that a signal 103a is produced. This signal 103a is integrated at 38, and the integrated output is supplied to an electric/fluid converter 39. This converter produces a fluid signal 105 by which the outlet gas temperature adjust valve 33 is operated.

If the change of the gas constitution is small, if the specific heat is approximately constant, and if the pattern of heat/heated gas flow and total heat change is properly recognized as the dynamic characteristics of the plant, then the minor loop shown in FIG. 2 suffices for sufficient control. However, if the gas constitution is greatly changed and if the total heat exchange of gas is large and includes indefinite factors, a possibility that a limiting condition is not satisfied is caused under a single PI (proportional integration) control constant condition.

If the cost is not limited, another measuring end is provided for the means of predicting control or the like. If the minor loop control is persistently used, it is necessary to make the control more flexible.

Figure 3:
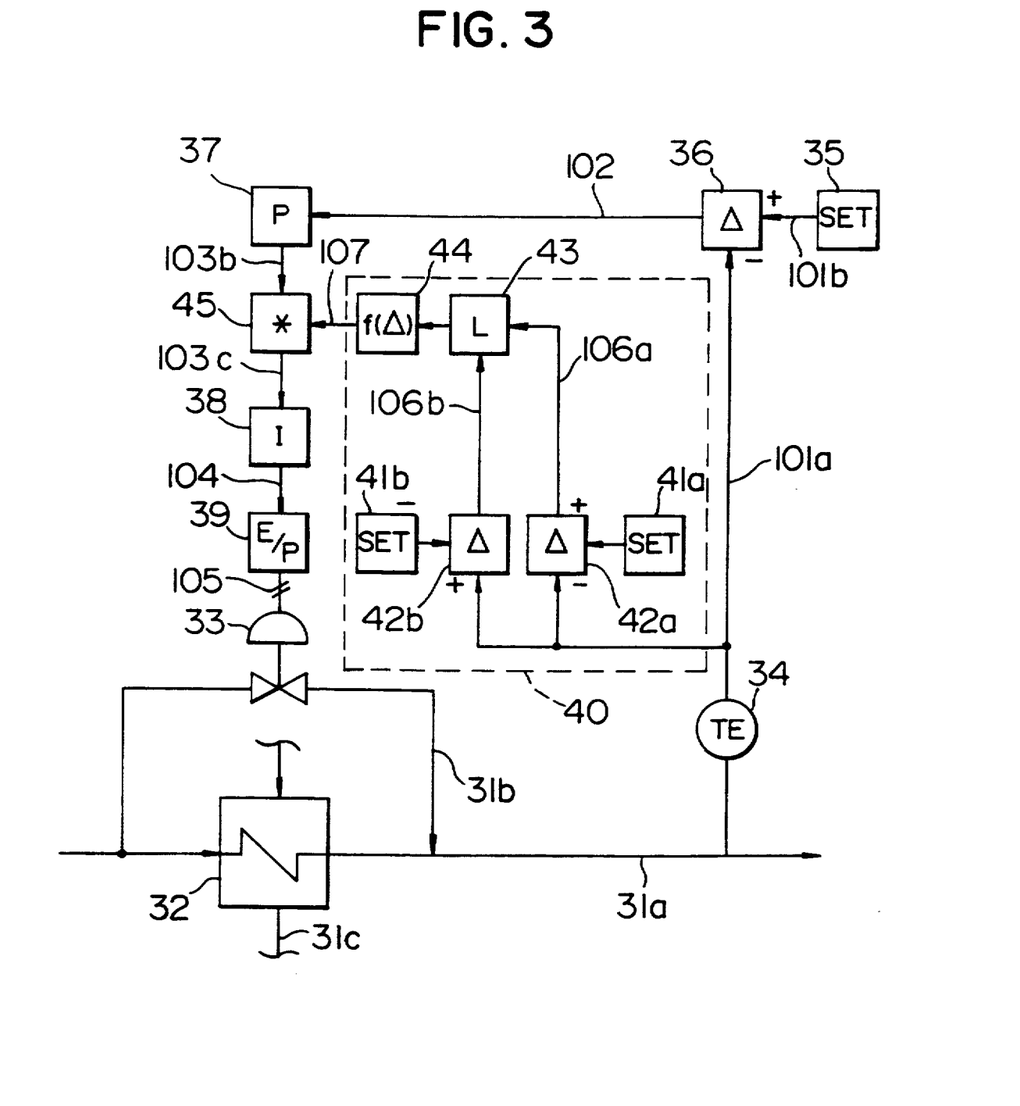
FIG. 3 is a logic diagram for gas/gas heat exchanger outlet gas temperature margin control.

FIG. 3 shows an embodiment capable of a flexible control by changing the control constant in accordance with the margin limited to the allowable temperature value. The portion surrounded by a broken line 40 in FIG. 3 is a calculation portion for calculating a control proportional gain correction factor according to the allowable temperature limited margin. The output from the calculation portion 40 is multiplied by the original control proportional gain Kc at a multiplier 45. In the calculation portion surrounded by the broken line 40, allowable limit setting devices 41a, 41b set the temperature to the upper and lower limit values. The calculators, 42a, 42b calculate margin values, or differences between the measured value 101a and the upper and lower limit values. A low selector 43 selects a smaller one of the margin values. A function device 44 produces a margin proportional gain correction function f(Δ) value 107. The multiplier 45 causes the value 107 to be multiplied by the control proportional gain 103b, thus producing the margin correction control proportional gain 103c. This gain is transmitted to an integrator 38. In this embodiment, the margin correction proportional gain $K_a$ is expressed by the following equation.

$$K_a = f(\min(X_1 - X(t), X(t) - X_2)) \times K_c$$

where $X_1$ and $X_2$ are the upper and lower limits of the amount of control process, and X(t) is the amount of an actual process. The function form of the margin proportional gain correction function f is necessary to satisfy at least the following condition. First, when the amount of control process (X) is near the target value of control, f is generally "1". In other words, the proportional gain is approximately equal to the set value as long as it is near the target value of control.

Second, the newly set margin correction proportional gain is limited so that the operation speed at the auxiliary does not exceed the maximum operation speed. (However, the control valve or the like is normally subjected to a limiter operation in the electric/fluid converter.)

Figure 4:
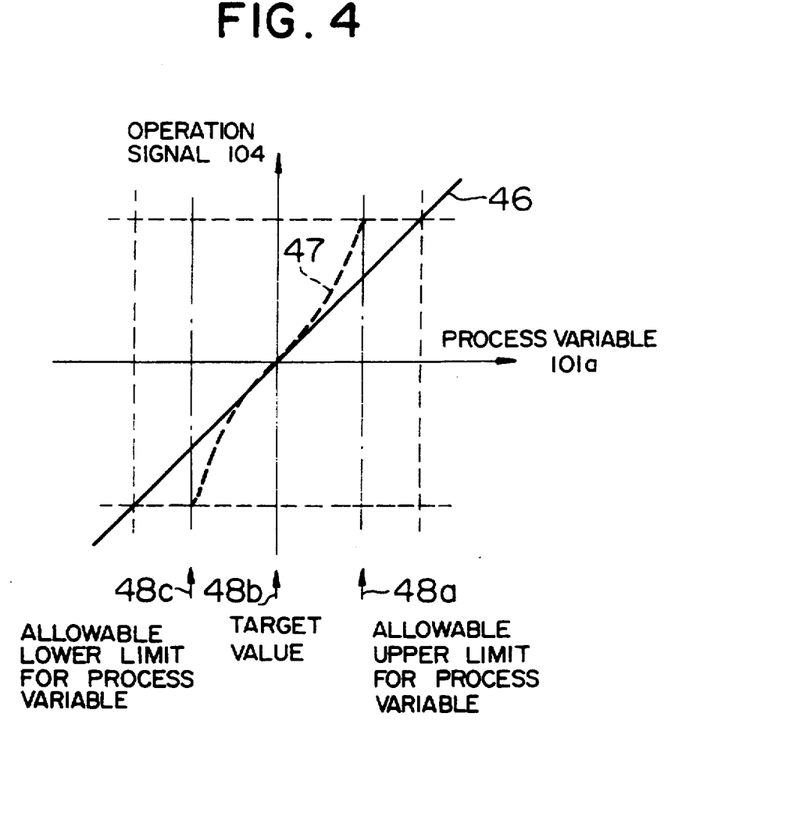
FIG. 4 is a graph of a margin control correction proportional gain.

The above two conditions can be shown by the graph according to axes corresponding to the process variable 101a and the operation signal 104 in FIG. 4. A straight line 46 indicates the operation signal 104 when the proportional gain $K_c$ is constant. The broken line 47 is the operation signal under the margin correction coefficient gain $K_a$. Further, 48a to 48c indicate an allowable upper limit $X_1$, a control target value $X_0$, and an allowable lower limit $X_2$ of a process variable, respectively. In FIG. 4, the characteristic 47 of the margin correction proportional gain $K_a$ becomes relatively larger than the characteristic 46 of the original proportional gain $K_c$ as it approaches the allowable limits 48a, 48c of the process variable. When it reaches a limit 48a or 48c, the operation signal will be a maximum value defined by the line 46 for the process variable at the limit 48a or 48c depending on an original proportional gain $K_c$. In FIG. 4, for convenience of explanation, the integration time, T=0, and the limits 48a, 48c of the process variable are assumed to be equally separated from the control target value $X_0$ of the process variable, or have the same difference therefrom.

Figure 5:
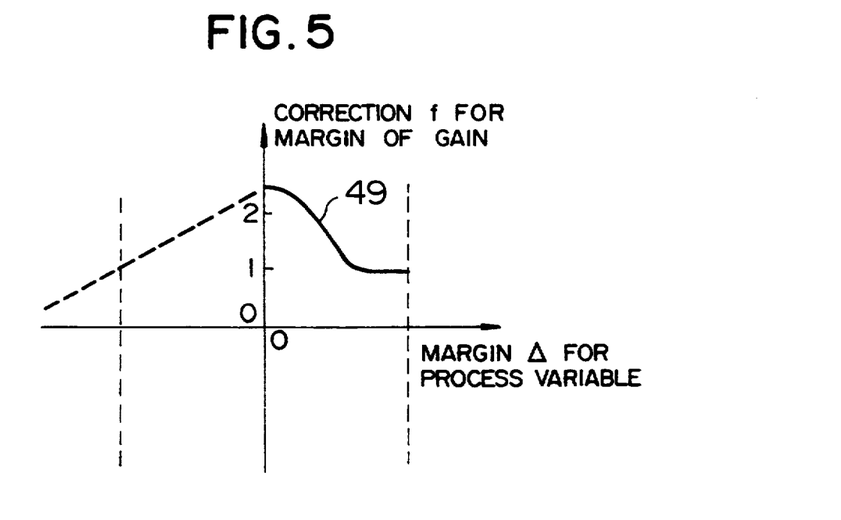
FIG. 5 is a graph of a margin-proportional gain correction function.

FIG. 5 shows the characteristic 49 of the margin-proportional gain correction function f. The function f is approximately 1 when the process variable is near the target value, and as the margin Δ of the process amount approaches 0, it approaches a maximum value. When Δ ≦ 0, the function linearly decreases on the basis of the limit of the operation of the auxiliary.

A description will be made of the result of the use of the margin correction control based on the characteristics shown in FIGS. 4 and 5.

Figure 6A:
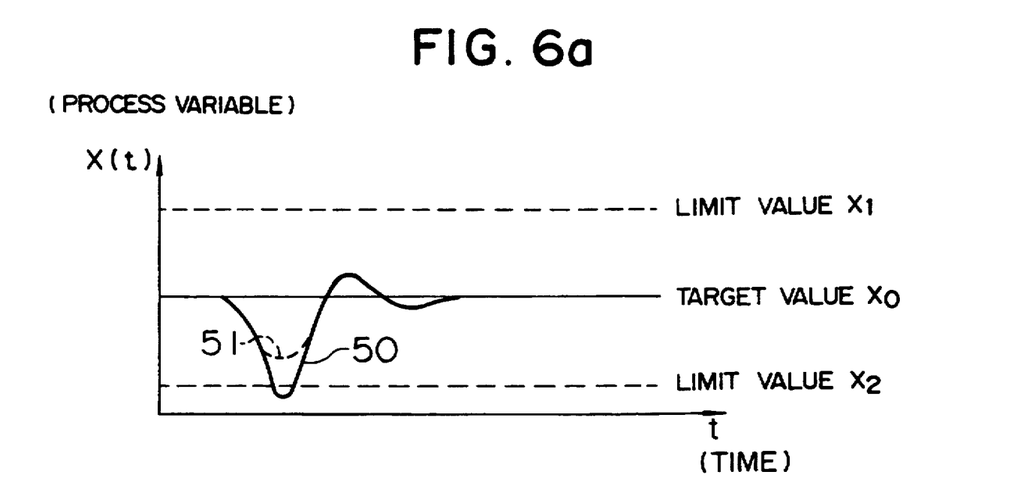
FIGS. 6a, 6b and 6c are graphs of the process variable, operation signal and auxiliary state amount under the margin-proportional gain correction control.

FIG. 6a is a qualitative representation of the change of process variable X(t) with time under the margin-proportional gain correction control shown in FIGS. 3 to 5.

The solid line, 50 in FIG. 6a indicates the change of the amount of process when the control proportional gain $K_c$ is constant. When a disturbance occurs in the amount of a process, the curve of the process variable X(t) is so changed that it cannot be controlled under a set $K_c$. A broken curve 51 shows the process variable X(t) under the margin-proportional gain correction control. As the process variable X(t) approaches to the lower limit $X_2$, a high order feedback is applied to prevent it from exceeding the limit $X_2$.

Figure 6B:
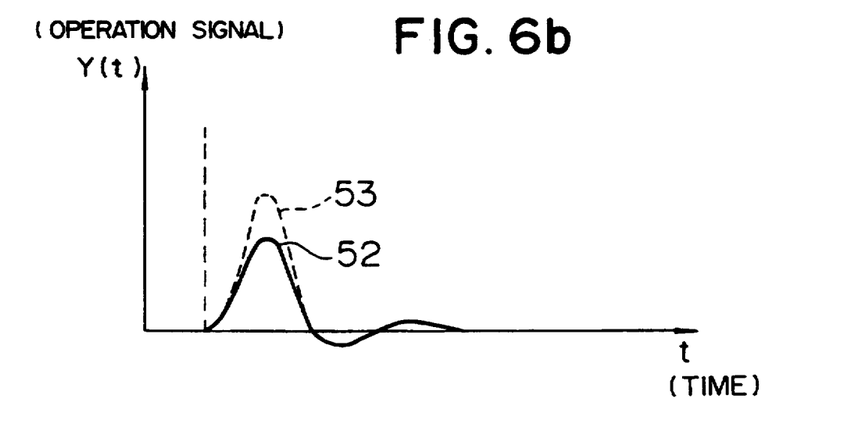

FIG. 6b shows the change of the operation signal Y(t) with time under the presence and absence of the margin-proportional correction control. The solid line 52 is the operation signal under the absence of the control, and the broken line 53 is the operation signal under the presence of the control.

Figure 6C:
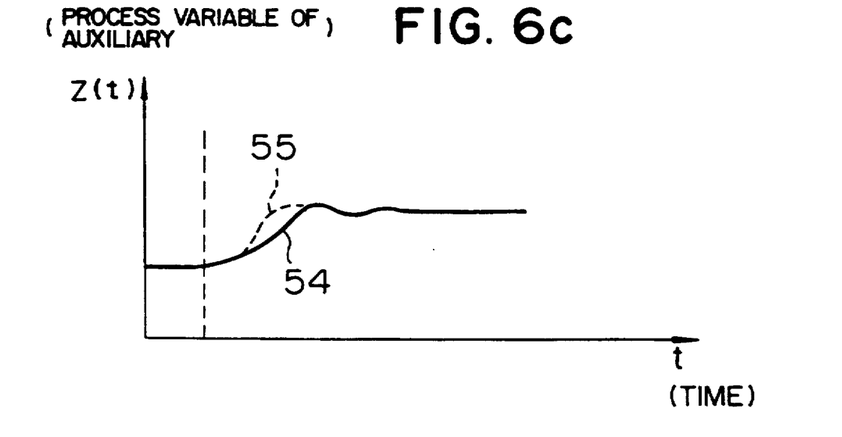

FIG. 6c shows the change of the auxiliary state amount Z(t) with time under the margin-proportional gain correction control. This auxiliary state amount corresponds to the opening of valve if the auxiliary is a valve. The solid-line curve 54 is obtained under the absence of the correction control, and the broken-line curve 55 is obtained under the presence of the correction control.

The control parameter which can reflect the margin value may be the gain as shown in this embodiment, a bias value, PID control constant, function f as in the super serge prevention control of a compressor, and all the parameters shown in the control logic diagrams.

Margin values may be provided for the limit value of the process component apparatus as in this embodiment, the rate-of-change limit of the process state amount, the allowable life consumption rate of the process component apparatus, the allowable consumption amount such as an amount of water supply, the allowable operation region of a control valve, compressor or the like, and the time necessary for arriving at the target value as in the start of an apparatus or plant.

Specific applications will be given below.

1) Limit value of process component apparatus.

Figure 7:
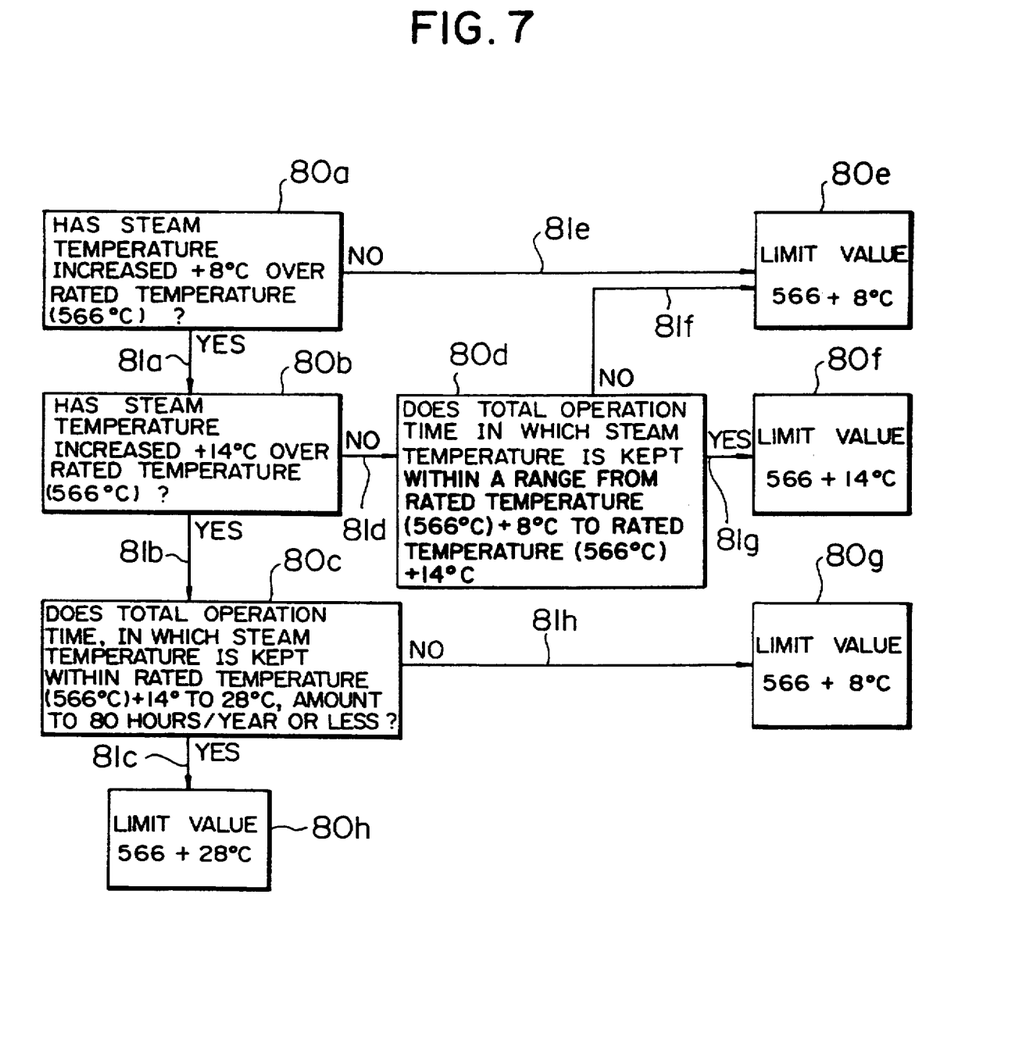
FIG. 7 is a diagram showing an example (steam turbine's temperature) of a variable limit of a process apparatus.

FIG. 7 shows an example of a variable limit of a process apparatus, or a variable limit of a vapor temperature. In a typical system turbine, the target value of temperature of flowing steam is set to 566° C. When the temperature is increased 8° C. over the limited target value, an alarm is issued. This alarm is concerned with the turbine heat resistance limit. If the integrated thermal fatigue is within an allowable range, the temperature may transiently overshoot to some extent. At this time, when the limit value is fixed to 566° C.+8° C., an alarm is issued for the allowable overshoot of steam temperature. This alarm is not always required. Another method can be considered in which the limit of the vapor temperature is changed on the basis of an operation integrated time (i.e., an accumulated time of operation of the apparatus) at a high vapor temperature. FIG. 7 shows an example of a variable limit (steam turbine temperature) of a process apparatus. In the prior art, when a process state 80a occurs, only an alarm is issued at a limit value of 80e (566°+8° C.). However, with respect to consideration of the thermal fatigue of the steam turbine, if the integrated value of the transient overshoot time is less than a certain value, the limit value may exceed 80e(566°+8° C.). In the example of FIG. 7, four vapor temperature ranges are provided: 566≦T≦566+8, 566+8≦T≦566+14, 566+14≦T≦566+28, and 566+28≦T. If the integrated operation time per year is less than a value (condition 80c, 80d), the original limit value 80f, 80h exceeding the original limit value 80e is employed. If the condition 80c, 80d is not satisfied, the original limit value 80e is employed. Thus, the control can be made more usefully.

2) An example of rate-of-change limit of a process variable (boiler heat-conductive tube)

Figure 8:
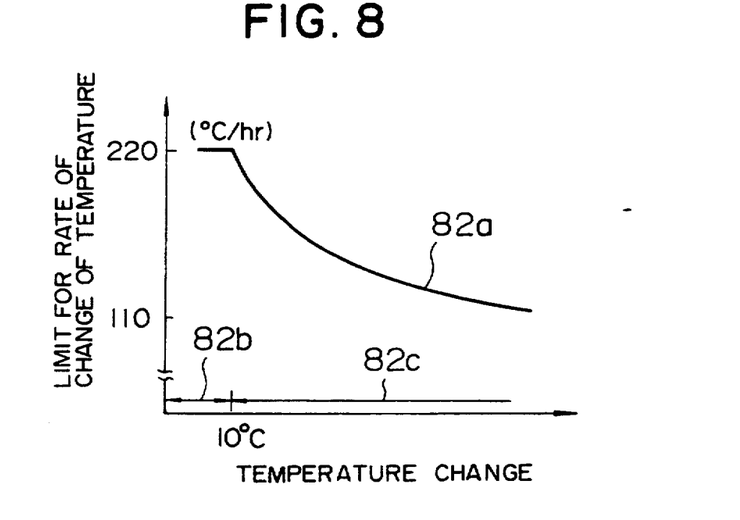
FIG. 8 is a graph showing an example (boiler heat-conductive tube) of a rate-of-change limit of a process variable.

FIG. 8 shows an example of a variable temperature rate-of-change limit of a boiler heat-conductive tube. In the prior art, a limit value of 110° C./hr is used for the temperature rate-of-change limit of a typical boiler heat-conductive tube. Normally, the temperature width of change of a boiler heat-conductive tube is determined by the operation schedule of the boiler. If the operation schedule is uncertain, the temperature rate-of-change limit is not always fixed. In other words, the temperature rate-of-change is set to within a limit value when the apparatus is operated within the limit of its thermal stress fatigue. When the boundary temperature is changed stepwise the transient thermal stress in the heat-conductive tube will become larger as the width of the stepwise change becomes larger.

In this embodiment, when the temperature change width is small, the limit of a temperature rate-of-change is increased, and if the temperature change width is large, it is set to be close to the conventionally used limit. In other words, the temperature rate-of-change limit $(\partial T_B/\partial t)res$ is given as $$(\partial T_B/\partial t)\ res\ (\Delta T) = \begin{cases} 220(°C.)\ \text{(temperature change width} < 10°\ C.\ \ldots\ \text{region } 82b) \\ 110*(1\ \exp[-\Delta T/K]) + 110(°C.) \\ \text{(temperature change width} > 10°\ C.\ \ldots\ \text{region } 82c) \end{cases}$$

where K is the attenuation constant for a temperature change width.

Thus, the maximum ability of the boiler can be utilized by this system, and an unnecessary alarm output can be expected to be reduced.

3) Allowable life consumption amount (rate) of a process apparatus.

As an example of this approach, the life consumption rate of the steam turbine rotor is required to be placed on an optimum consumption control according to the results of turbine operation and a future operation schedule. In the prior art, a life consumption rate per load change is regarded to be constant and is used to provide a limit. This limit is changed according to a rational life allocation in which the life consumption rate and residual life based on the results of the past operation are practically applied to the future operation of the steam turbine rotor. The life of the steam turbine plant can be effectively consumed by this change of limit.

Figure 9:
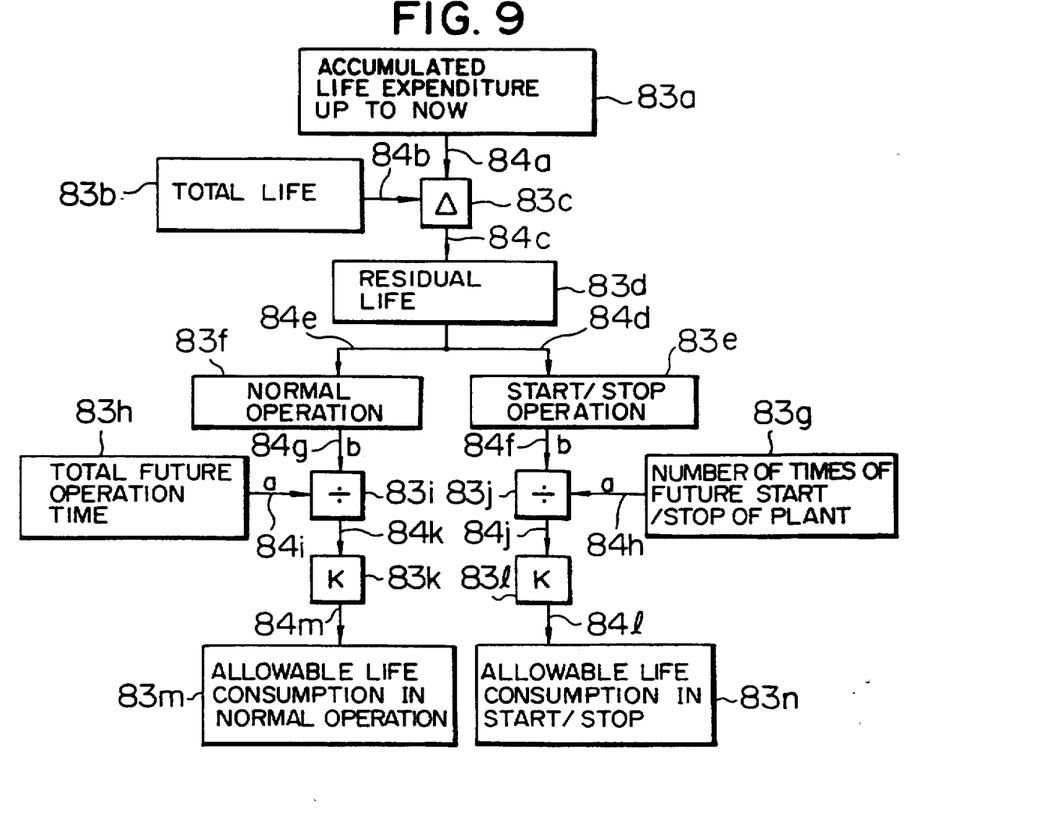
FIG. 9 is a diagram showing an example of a variable-limit of an allowable life consumption amount of a process apparatus.

FIG. 9 shows an example of a variable limit for the allowable life consumption rate of a process apparatus.

In this embodiment, the residual life amount 83d is calculated from the difference between the life consumption integrated value 83a of the steam turbine plant up to the present time and the total life value 83b. The residual life is divided into a consumption amount 83f for the normal operation and a consumption amount 83e for start-stop operation according to the operation plan of the plant. The allowable life consumption value 83m for the normal operation and the allowable life consumption value 83n for start-stop operation in the present condition are calculated from the total expected operation time 83h and the expected number of start-stop times 83g of the plant, and are used as variable limit values for the allowable life consumption amount of plant. Therefore, while in the prior art the start-stop operation time is controlled by a schedule and the target time is fixed, this embodiment can make the most use of the life of the steam turbine plant by resetting the start-stop time according to the residual life value.

4) Allowable consumption amount (energy loss, amount of use of supply water, and so on).

Figure 10A:
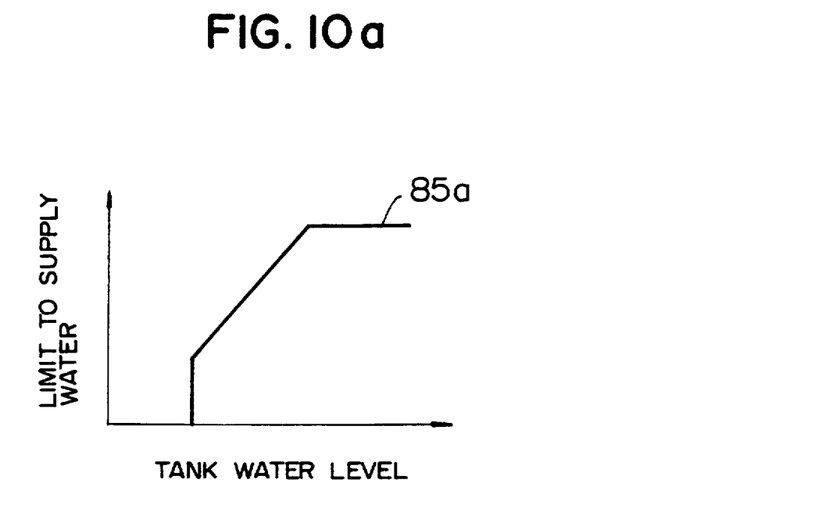
FIGS. 10a and 10b are diagrams of examples (water supply tank, coal mill) of an allowable consumption variable limit.

FIG. 10a shows an example of the valuable limit of the allowable consumption amount of a supply water tank.

In the prior art, the consumption amount of supply water in a supply tank is not limited, and only an alarm is issued when the tank water level is low, or no action is present for a low water level. In this embodiment, a limit value is set for the amount of use of supply water in accordance with the tank's water level as shown by a curve 85a. Thus, the amount of use of supply water is transiently suppressed, and a useless alarm output is stopped.

Figure 10B:
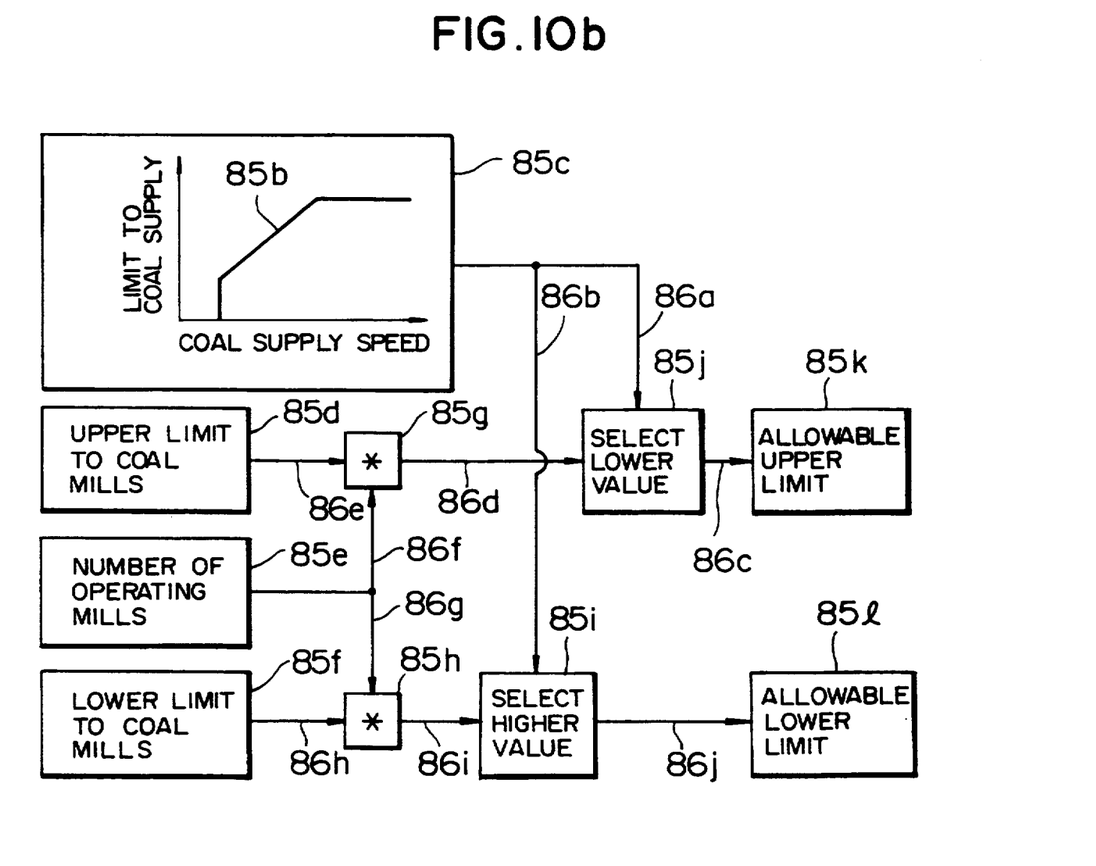

FIG. 10b shows an example of the variable limit value of the allowable consumption amount in a coal mill. In the prior art, the allowable upper limit and lower limit are established according to the upper and lower limit values of a coal mill and the number of machines of the coal mill. In this embodiment, the limit to the amount of coal supply is set as shown by the curve 85b according to the coal supply speed. For the allowable upper limit 85k, a low value is selected and produced according to the total coal mill upper limit 86d, 86a, and for the allowable lower limit 85l, a high value is selected and produced according to the total coal mill lower limit value 86i, 86b. Thus, the allowable upper and lower limit values can be established considering the case in which the speed of the coal supply machine is transiently low. The coal supply and supply coal amount monitoring can be flexibly performed by limiting the supply of the pulverized coal to the boiler as the case demands.

5) Allowable operation region of a valve, control valve, apparatus, and so on.

Figure 11A:
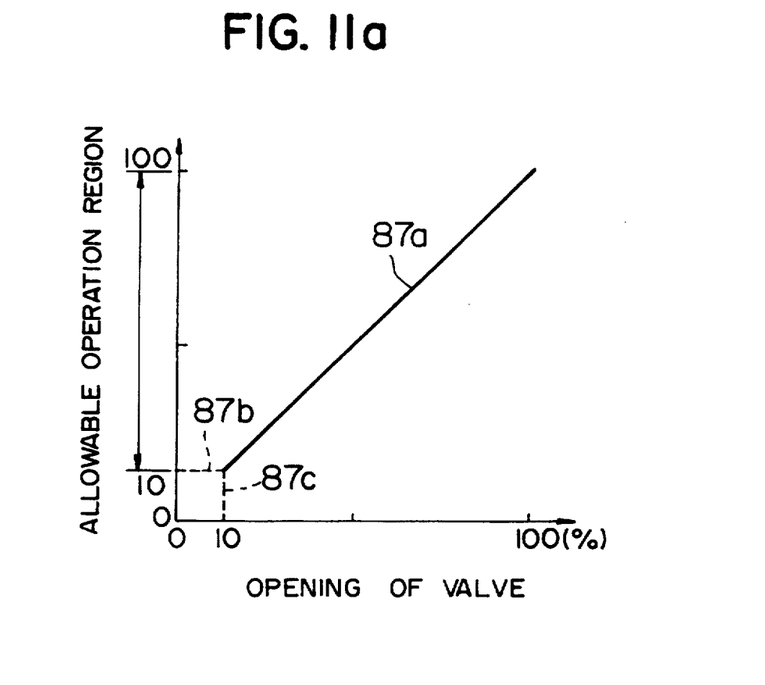
FIGS. 11a and 11b are diagrams of examples of an allowable operation region and variable operation region of a control valve.

In the prior art, a control valve is not permitted to be at a low opening. This is because a low-opening position with respect to a valve causes erosion. This region has so far been placed on a strictly on-off type of control. FIG. 11a shows the allowable operation region of the control valve.

Figure 11B:
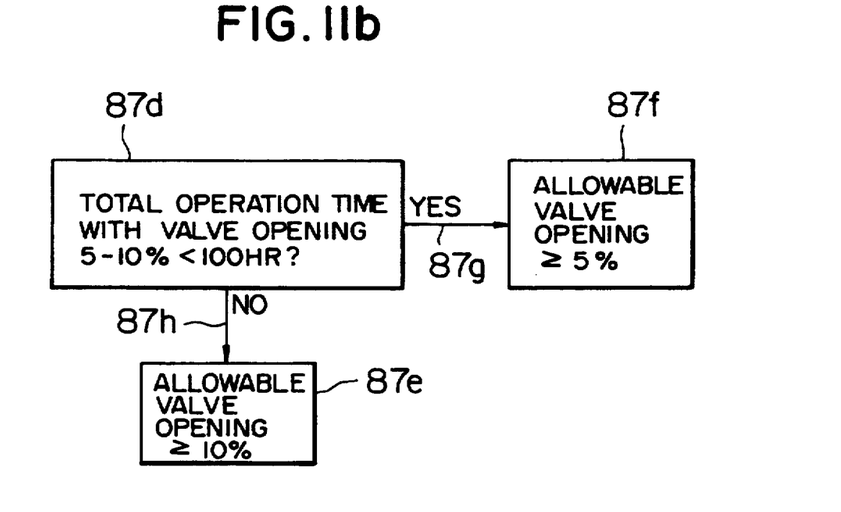

However, the transient control in the low opening region may contribute to the stability of the system. FIG. 11b shows an example of the variable operation region of the control valve.

In this embodiment, the total operation integrated time for a region of 5 to 10% of a valve opening is 100 HR or below. If a condition 87d is satisfied, the allowable valve opening is selected to be 5%. If the condition 87d is not satisfied, the allowable valve opening is selected to be 10% or above. Thus, the transient operation for the region of a 5% to 10% value opening, if necessary, can be controlled more flexibly. The set value of the maximum operation integrated time 100 HR for the control valve which can be operated at a low opening is defined as the maximum operation time without the problem of erosion. When this system is used, the soft logic (i.e., software) of the controller is easy to change.

Figure 12:
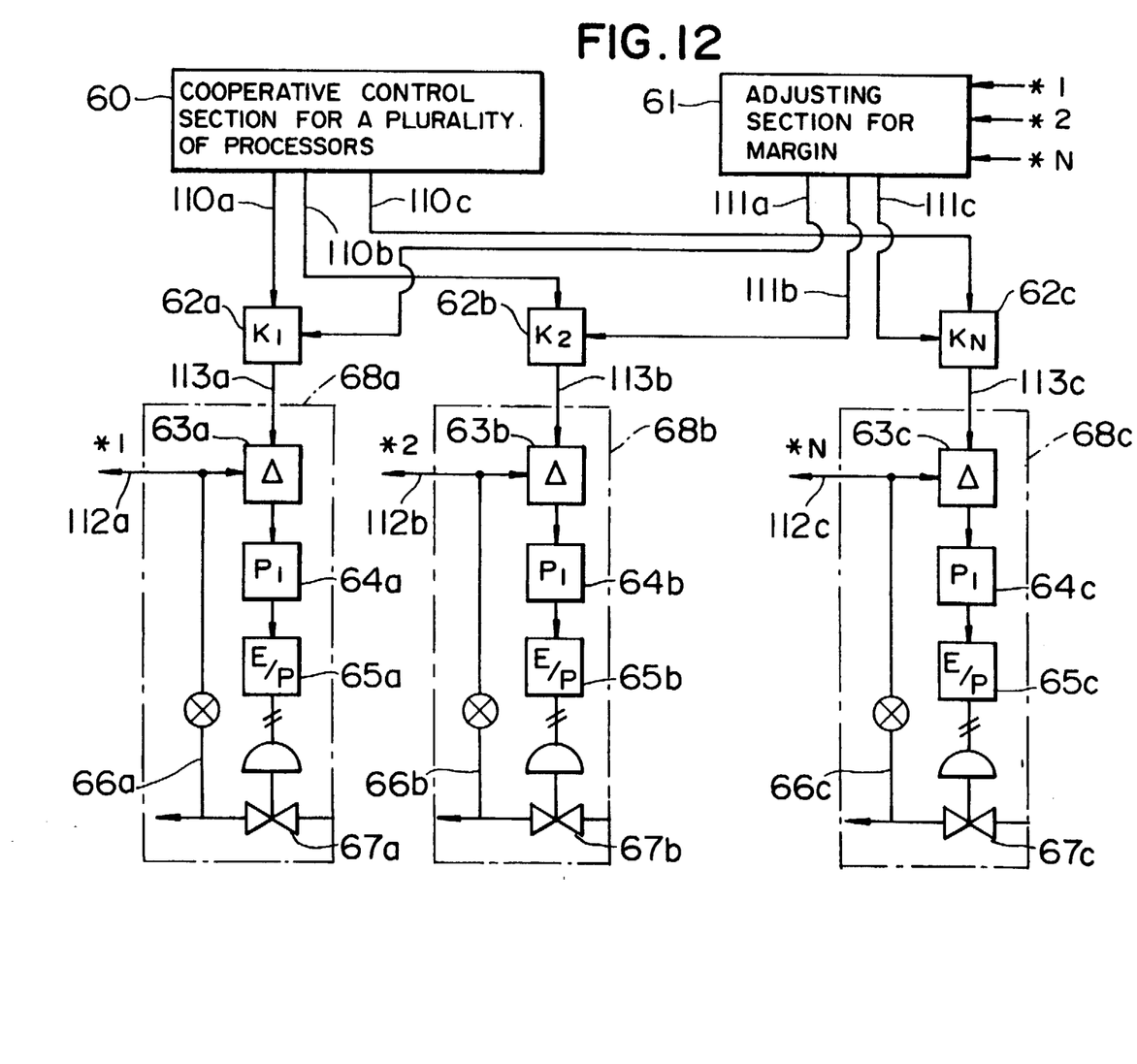
FIG. 12 is a diagram showing a margin-proportional gain adjustment in a cooperative control system.

FIG. 12 shows another embodiment of a gain control adjustment based on the margin of a cooperative control system. In the normal control, a cooperative control section 60 for a plurality of processes establishes target values 113a to 113c for PI control portions 68a to 68c of auxiliaries 67a to 67c for respective process variables, making a cooperative operation for respective process variable minor controls. The control constants are normally established to follow assumed process variable variations. In the practical plant, there is the possibility that the amount of a process exceeds the limit of the apparatus in the case of an occurrence of an unexpected external disturbance, variations of the process variable dynamic characteristics due to the secular deterioration (i.e., deterioration over a long period of time) of the apparatus and at a predetermined unusual operation mode.

Therefore, in this embodiment, an operation allowable limit margin adjust section 61 is provided to multiply the target values 110a to 110c from the cooperative control section 60 by gains 62a to 62c according to the margin values, thereby increasing the margin values so that the apparatus are prevented from being operated beyond the limiting conditions by any unexpected external disturbance and so on. The margin adjust section 61 is supplied with measured values 112a to 112c from detection ends 66a to 66c for the respective process variables. Thus, this adjust section 61 calculates the difference $\Delta I(I=1 \sim N)$ between the input values and the process variable limit values $X_{t1}$, $X_{t2}$ (i=1, ..., N) established within the margin adjust portion 61, and multiplies the set target values 110a to 110c from the cooperative control portion 60 by a gain $K_{at}$ ($\Delta i$)- (i=1~N) as a function of a difference $\Delta i$.

According to this method, since the control based on the cooperative control used so far is possible, the minor control and cooperative control sections for the respective process variables can be designed and adjusted on the basis of the conventional idea.

The idea of gain $K_{at}$ ($\Delta i$)(i=1~N) is fundamentally the same as in the embodiment of the gas/gas heat exchanger. Since the gain $K_{at}$ ($\Delta i$)(i=1~N) can be set which can follow the external disturbance having a standard deviation of three times as large as that of the expected external disturbance, the margin adjustment can be satisfactorily achieved in the practical application.

Figure 13:
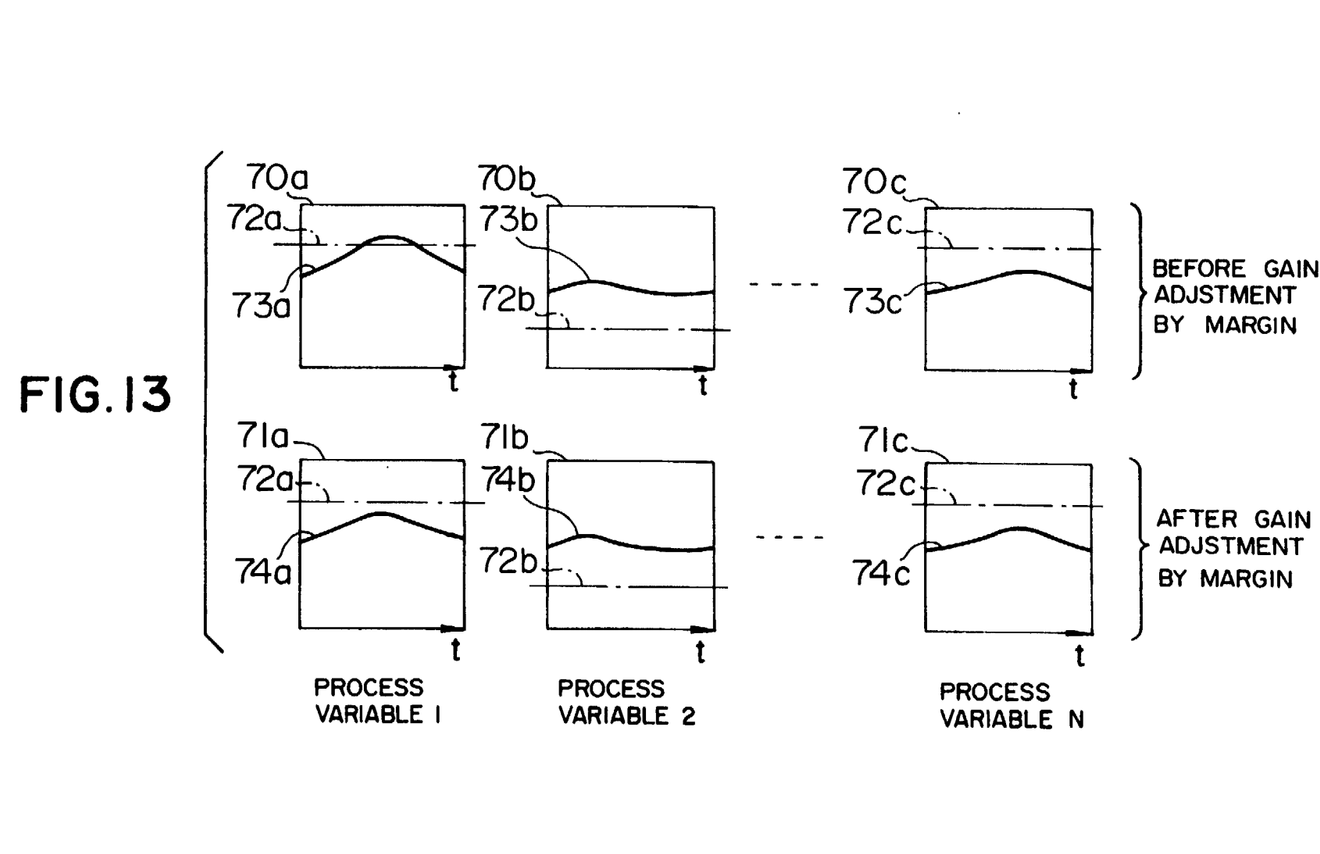
FIG. 13 is a diagram showing the change of a process variable with time in margin-proportional gain adjustment cooperative control.

FIG. 13 shows the change of a process variable with time in the margin-proportional gain adjustment cooperative control. Upper and lower limits 72a to 72c of process variables are established for the respective process variables 1~N. If there is an external disturbance 73a which cannot be covered, the target value from the cooperative control section 60 is multiplied by the gain 62a shown in FIG. 12, whereby the change of the process variable with time is improved from curve 73a to 74a.

As described above, in the plant containing one or more processes (or formed of only one process), it is important to coincide the process variable with a target, and it is also more important from the plant operation point of view to make the control reflecting the durability performance of hardware dependent on the specifications of apparatus, the operation margin seen from the life consumption rate and plant operation, and the allowance seen from the ability of the apparatus.

According to one main feature of the invention, the strength of control is dynamically changed in accordance with a margin of a process variable allowable limit which changes with an operation condition in the control of the process variable.

Therefore, in the control system for controlling the process variable (or a plurality of process variables) to reach the target value which is determined by the corresponding auxiliary, the measured value of the process variable is changed within the allowance which the process provides, and the operation parameter of the process control is changed according to the margin to the maximum allowance for the operation state.

According to the above embodiments, since the durability performance of the hardware is dependent on the specifications of the apparatus, the operation margin seen from the life consumption rate and plant operation and the allowance seen frown the ability of the apparatus are equally considered, the cooperative control system for the whole plant can be built up. In addition, the margin reflecting the continuously changing plant operation state can be rationally used for improving the control ability, and respective apparatus can be maintained in good condition.

We claim:

1. A plant control system comprising:
   an object to be controlled and having a control device for effecting control;
   a detector for detecting a process variable of said object to be controlled;
   a setting device for setting a target value of said process variable; and
   an adjuster for controlling said control device of said object in accordance with a difference between an output of said setting device and an output of said detector,
   wherein said plant control system further comprises storage means for storing a limit value established for said process variable for a purpose of protecting said object to be controlled, difference determining means for determining a difference between said limit value and a detected said process variable, and means for correcting a characteristic of said adjuster in accordance with an output of said difference determining means.

2. A plant control system as claimed in claim 1, comprising:
   a plurality of objects to be controlled, said plurality of objects including said object, a plurality of control devices including said control device, with each respective control device for effecting control of a respective object of said plurality of objects, detectors including said detector and being respectively provided for said control devices and for detecting said process variable for controlling an associated control device, and adjusters, including said adjustor, for controlling said control devices of said objects to be controlled, in accordance with differences between target values for said process variable and outputs of said detectors; and
   said setting device comprising a target value command means for providing said target values of said process variable, said target values being specific to said plurality of control devices,
   wherein said storage means is for storing limit values including said limit value, said limit values being established in the form of an exponent for a purpose of protecting said objects to be controlled, and said means for correcting being for correcting characteristics of said adjusters of said plurality of control devices in accordance with an output of said difference determining means.

3. A plant control system comprising:

an object to be controlled and having a control device for effecting control;

a first detector for detecting a first process variable of said object to be controlled;

a setting device for setting a target value of said first process variable; and an adjuster for controlling said control device of said object in accordance with a difference between an output of said setting device and an output of said detector, wherein said plant control system further comprises a means for determining a second process variable from said first process variable, a storage means for storing a limit value established for said second process variable for a purpose of protecting said object to be controlled a, difference determining means for determining a difference between said limit value and said determined second process variable and a means for correcting a characteristic of said adjuster in accordance with an output of said difference determining means.

4. A plant control system comprising:

a plurality of objects to be controlled, a plurality of control devices with each respective control device for effecting control of a respective object of said plurality of objects, detectors respectively provided for said control devices and for detecting process variables for controlling said control devices, and adjusters for controlling said control devices of said objects to be controlled, in accordance with differences between target values for said process variables and outputs of said detectors; and a target value command means for providing said target values for said process variables, said target values being specific to said plurality of control devices, wherein said plant control system further comprises a storage means for storing limit values established for said process variables for a purpose of protecting said objects to be controlled, a difference determining means for determining differences between said limit values and detected said process variables, and a means for correcting characteristics of said adjusters of said plurality of control devices in accordance with an output of said difference determining means.

5. A plant control system comprising:

an object to be controlled and having a control device for effecting control;

a first detector for detecting a first process variable for controlling said control device of said object to be controlled;

a setting device for setting a target value for said first process variable; and an adjuster for controlling said control device of said object in accordance with a difference between an output of said setting device and an output of said first detector;

wherein said plant control system further comprises a means for determining a second process variable from said first process variable, a storage means for storing a limit value established for said second process variable for a purpose of protecting said object to be controlled, a difference determining means for determining a difference between said limit value and said determined second process variable, and a means for correcting a characteristic of said adjuster in accordance with an output of said difference determining means.

6. A plant control system comprising:

an object to be controlled and having a control device;

a detector for detecting a process variable of said object to be controlled;

a setting device for setting a target value of said process variable; and an adjuster for controlling said control device of said object in accordance with a difference between an output of said setting device and an output of said detector, wherein a life expenditure of said object to be controlled is evaluated, a residual life is used as an adjust parameter of said adjuster, and said target value of said process variable is established in accordance with an output of said adjuster.

7. A plant control system according to claim 6, wherein when said target value of said process variable is established by evaluating said residual life, an allowable operation amount with respect to at least one of an expected life and expected start/stop operational life is calculated in relation with an establishment of said output of an adjuster of another apparatus constituting said plant, and said target value is established from said allowable operation amount in order to make cooperative control to consider said expected life and said expected start/stop operational life of equipment of said plant.

8. A plant control system according to claim 7, wherein said allowable operation amount is calculated on a basis of said residual life in which a corresponding apparatus can be operated safely, and is calculated with a goal such that lives of all apparatus are exhausted at substantially a same time.

* * * * *